United States Patent [19]

Kaneko

[11] 4,453,157
[45] Jun. 5, 1984

[54] BI-PHASE SPACE CODE DATA SIGNAL REPRODUCING CIRCUIT

[75] Inventor: Kenji Kaneko, Iwai, Japan

[73] Assignee: Victor Company of Japan, Ltd., Yokohama, Japan

[21] Appl. No.: 341,369

[22] Filed: Jan. 21, 1982

[30] Foreign Application Priority Data

Jan. 26, 1981 [JP] Japan .................................. 56-9922

[51] Int. Cl.³ .............................................. G11B 5/09
[52] U.S. Cl. .............................. 340/347 DD; 360/43
[58] Field of Search ........................... 360/43, 42, 44; 235/449; 340/347 DD

[56] References Cited

U.S. PATENT DOCUMENTS 3,736,581  5/1973  Breikss ................................. 360/43
4,012,786  3/1977  McKie et al. ..................... 360/43 X
4,139,870  2/1979  Tachi ................................... 360/43

*Primary Examiner*—T. J. Sloyan
*Attorney, Agent, or Firm*—Ladas & Parry

[57] ABSTRACT

A bi-phase space code data signal reproducing circuit comprises a clock pulse supplying circuit for supplying a clock pulse having a period which is 1/N (N is an integer) of a bit period T of a bi-phase space code data signal to be reproduced, a shift register supplied with the clock pulse, for performing a shifting operation, a main flip-flop supplied with the data signal and an output signal obtained from an intermediate part of the shift register, for holding a sampling value of the data signal at a point which is substantially T/4 from the beginning of each data of the data signal, an exclusive-OR circuit supplied with an output signal of the main flip-flop and said data signal, and a reproduced data obtaining circuit for sampling an output signal of the exclusive-OR circuit by a sampling clock at a point which is substantially 3T/4 from the beginning of each data of the data signal obtained from the shift register, to obtain a reproduced data.

4 Claims, 3 Drawing Figures

4,453,157

BI-PHASE SPACE CODE DATA SIGNAL REPRODUCING CIRCUIT

BACKGROUND OF THE INVENTION

The present invention generally relates to circuits for reproducing a bi-phase space code data signal, and more particularly to a bi-phase space code data signal reproducing circuit constructed solely from digital circuits, and having a circuit construction suited for manufacturing the reproducing circuit as an integrated circuit.

Conventionally, a bi-phase space code data signal reproducing circuit had a circuit construction consisting of monostable multivibrators, an inverter, a delay circuit, an exclusive-OR circuit, an AND circuit, and the like. However, since the conventional reproducing circuit included the monostable multivibrators, it was difficult to adjust the time constants of these monostable multivibrators. Hence, there was a disadvantage in that it was difficult to manufacture the reproducing circuit as an integrated circuit.

SUMMARY OF THE INVENTION

Accordingly, it is a general object of the present invention to provide a novel and useful bi-phase space code data signal reproducing apparatus in which the above described disadvantages have been overcome.

Another and more specific object of the present invention is to provide a bi-phase space code data signal reproducing circuit constructed from digital circuits. According to the circuit of the present invention, operations such as adjusting time constants of monostable multivibrators are not necessary, as was required in the conventional circuit. Moreover, the circuit according to the present invention can be easily manufactured as an integrated circuit, and has further advantages in that the circuit can be miniaturized and manufactured at low cost.

Other objects and further features of the present invention will be apparent from the following detailed description when read in conjunction with the accompanying drawings.

DETAILED DESCRIPTION

Figure 1:
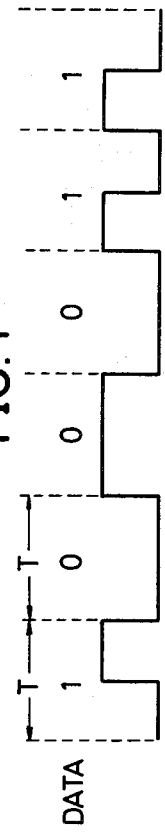
FIG. 1 indicates a waveform of a general bi-phase space code data signal.

Generally, a bi-phase space code data signal has a waveform indicated in FIG. 1. That is, the above bi-phase space code data signal has a waveform such that the signal is of low level (L-level) or high level (H-level) with a duty cycle of 50% within a bit period T when the data is "1", the signal is of L-level or H-level throughout the entire bit period T when the data is "0", and further, so that the L-level and H-level periods of the signal exist alternately.

Figure 2:
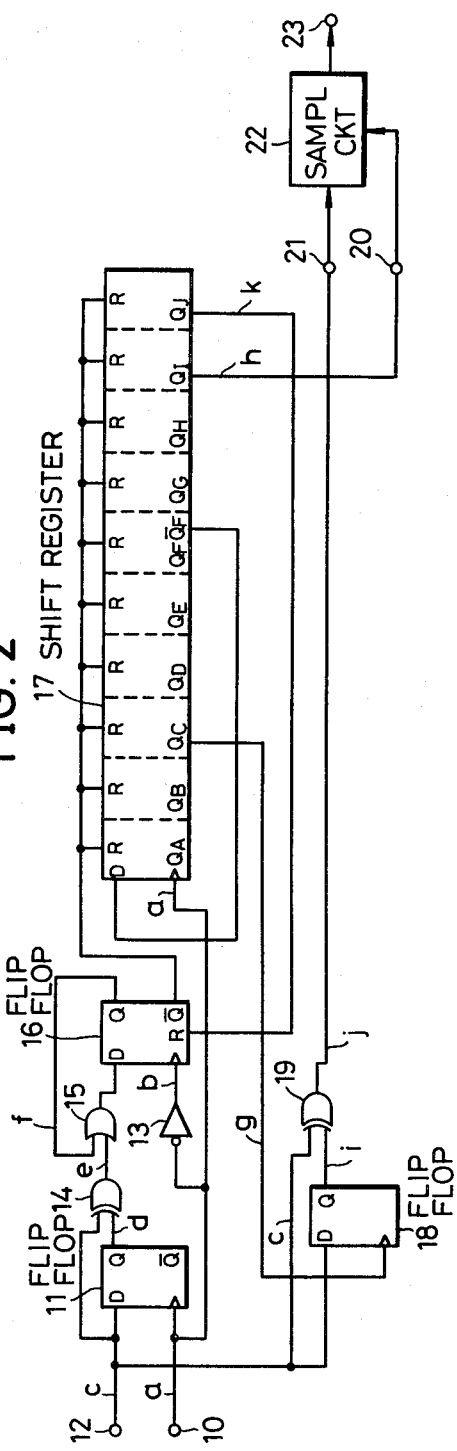
FIG. 2 is a system circuit diagram showing an embodiment of a bi-phase space code data signal reproducing circuit according to the present invention.
Figure 3:
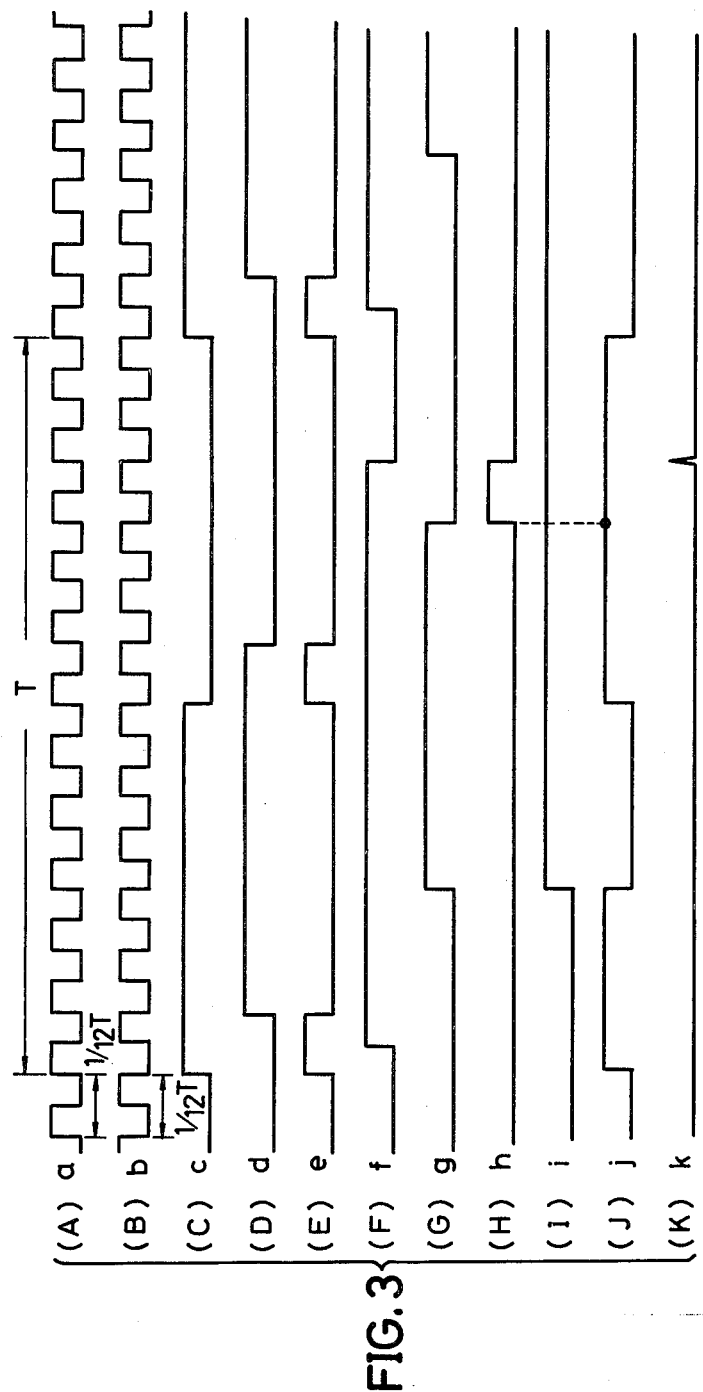
FIGS. 3(A) through 3(K) respectively indicate waveforms of signals at each part of the circuit system shown in FIG. 2.

An embodiment of a circuit for reproducing the bi-phase space code data signal having the above described waveform, will now be described in conjunction with FIG. 2. A clock pulse a having a period which is one-twelfth of the bit period T, for example, as indicated in FIG. 3(A), is applied to an input terminal 10. This clock pulse a is applied to a clock input terminal of a delay type (D-type) flip-flop 11. On the other hand, a bi-phase space code data signal c indicated in FIG. 3(C) is applied to an input terminal 12. This data signal c is applied to a data input terminal of the flip-flop 11. A signal d indicated in FIG. 3(D) is produced through a Q-output terminal of the above flip-flop 11. An exclusive-OR circuit 14 is supplied with the data signal c from the input terminal 12 and the output signal d from the flip-flop 11, and produces an edge signal e. As indicated in FIG. 3(E), the edge signal e has rising edges corresponding to the rising and falling edges of the data signal c. The above signal e is supplied to a data input terminal of a D-type flip-flop 16 through an OR circuit 15.

The clock pulse a from the input terminal 10 is inverted at an inverter 13, and then applied to a clock input terminal of the flip-flop 16 as a clock pulse b indicated in FIG. 3(B). A signal f indicated in FIG. 3(F) is obtained from a Q-output terminal of the flip-flop 16, and supplied to a data input terminal of the flip-flop 16 through the OR circuit 15. A signal having a waveform with an inverted phase from the above signal f is obtained from a $\overline{Q}$-output terminal of the flip-flop 16, and applied to reset terminals of a shift register 17.

The shift register 17 consists of ten stages of flip-flops, for example. A flip-flop QA at the initial stage of the shift register 17 is supplied with the clock pulse a from the input terminal 10, to perform a shift by this clock pulse. An output signal k indicated in FIG. 3(K) which is obtained from a flip-flop QJ at the final stage of the shift register 17, is applied to a reset terminal of the flip-flop 16 to reset the flip-flop 16. Accordingly, the fall in the output signal f of the flip-flop 16 is determined by the signal k. Since the signal k is obtained from the tenth flip-flop, the position of the signal k is at a position which is 10/12 of the bit period T from the beginning of the data signal c. An output signal H indicated in FIG. 3(H) which is obtained from a flip-flop QI at a stage which is one stage before the final stage of the shift register 17, is obtained from a terminal 20 and supplied to a sampling circuit (data discrimination circuit) 22 as a sampling clock pulse. The rising edge of the signal h is at a position which is 9/12, that is, ¾ of the bit period T from the beginning of the data signal c. A signal obtained from a $\overline{Q}$-output terminal of a flip-flop QF in the shift register 17, is applied to a data input terminal of the flip-flop QA at the initial stage of the shift register 17.

An output signal g indicated in FIG. 3(G) which is obtained from the third stage of the shift register 17, is applied to a clock input terminal of a D-type flip-flop 18. The data signal c from the input terminal 12 is applied to a data input terminal of the flip-flop 18, and the flip-flop 18 produces a signal i indicated in FIG. 3(I). The rise in this signal i corresponds to the rise in signal g. The rise in the signal g is at a position which is 3/12, that is, ¼ of the bit period T from the beginning of the data signal c. Accordingly, the above signal i is a signal for holding a value at a position which is ¼ of the bit period T from the beginning of the data signal c. The data signal c from the input terminal 12 and the output signal i of the flip-flop 18 are respectively supplied to an exclusive-OR circuit 19. The exclusive-OR circuit 19 produces a signal j indicated in FIG. 3(J).

The signal j from an output terminal 21 is sampled by the signal h from the output terminal 20, at the sampling circuit 22. When the sampling value is of H-level, the reproduced data is "1", and when the sampling value is of L-level, the reproduced data is "0". The reproduced data is obtained through an output terminal 23.

In the above described embodiment of the invention, the rise in the signals i and h are respectively selected to positions which are ¼ and ¾ of the bit period T from the beginning of the data signal c. However, the rising positions of these signals i and h may be slightly varied from these positions. Since the signal is of H-level and L-level with a duty cycle of 50% within the bit period T when the data is "1", it is desirable for these positions to correspond to an intermediate point between each H-level and L-level parts. Therefore, it is desirable for the above rising positions of the signals i and h to be at the positions which are ¼ and ¾ of the bit period T from the beginning of the data signal c.

According to the data reproducing circuit of the present invention, the circuit is solely constructed by flip-flops and gate circuits. The monostable multivibrators used in the conventional circuit are not used in the circuit according to the present invention. Thus, the circuit may be manufactured as an integrated circuit with ease, at low cost.

Further, the present invention is not limited to these embodiments, but various variations and modifications may be made without departing from the scope of the present invention.

What is claimed is:

1. A bi-phase space code data signal reproducing circuit comprising:
    clock pulse supplying means for supplying a clock pulse having a period which is 1/N (N is an integer) of a bit period T of a bi-phase space code data signal to be reproduced;
    a shift register supplied with said clock pulse, for performing a shifting operation;
    a main flip-flop supplied with said data signal and an output signal obtained from an intermediate part of said shift register, for holding a sampling value of said data signal at a point which is substantially T/4 from the beginning of each data of said data signal;
    an exclusive-OR circuit supplied with an output signal of said main flip-flop and said data signal; and
    a reproduced data obtaining circuit for sampling an output signal of said exclusive-OR circuit by a sampling clock at a point which is substantially 3T/4 from the beginning of each data of said data signal obtained from said shift register, to obtain a reproduced data.

2. A reproducing circuit as claimed in claim 1 in which said shift register consists of M (M is an integer smaller than N) stages of flip-flops, said reproducing circuit further comprises a reset signal forming circuit for forming a reset signal for resetting said shift register from said clock pulse, said data signal, and an output signal of a flip-flop at a final stage of said shift register, in which said main flip-flop is supplied with said data signal to its data input terminal and supplied with an output signal of a flip-flop at a predetermined stage of said shift register to its clock input terminal, and said sampling clock is obtained from a flip-flop at a stage which is one stage before the final stage of said shift register.

3. A reproducing circuit as claimed in claim 2 in which values of N and M are respectively selected to be 12 and 10, and said flip-flop at the predetermined stage for supplying the output signal to said main flip-flop is provided at a third stage of said shift register.

4. A reproducing circuit as claimed in claim 2 in which said reset signal forming circuit comprises:
    a second main flip-flop supplied with said data signal to its data input terminal and supplied with the clock pulse to its clock input terminal;
    a second exclusive-OR circuit supplied with said data signal and an output signal from a Q-output terminal of said second main flip-flop;
    a third main flip-flop supplied with a signal obtained by inverting the phase of said clock pulse to its clock input terminal; and
    an OR gate supplied with an output signal from a Q-output terminal of said third main flip-flop and an output of said second exclusive-OR circuit, to supply an output to a data input terminal of said third main flip-flop,
    said third main flip-flop being supplied with the output signal of the flip-flop at the final stage of said shift register at its reset terminal,
    an output signal from a Q-output terminal of said third main flip-flop being supplied to a reset terminal of said shift register.

* * * * *